United States Patent [19]
Brinkmann

[11] 3,935,388
[45] Jan. 27, 1976

[54] CIRCUIT ARRANGEMENT FOR SYNCHRONIZING A TELEVISION RECEIVER

[75] Inventor: Uwe Brinkmann, Nellingen, Germany

[73] Assignee: International Standard Electric Corporation, New York, N.Y.

[22] Filed: Oct. 9, 1974

[21] Appl. No.: 513,379

[30] Foreign Application Priority Data
Oct. 18, 1973  Germany............................ 2352355

[52] U.S. Cl............ 178/69.5 TV; 178/7.5 S; 331/20
[51] Int. Cl.[2]........................ H04L 7/00; H04N 5/04
[58] Field of Search..... 178/69.5 TV, 69.5 R, 7.3 S, 178/7.5 S; 331/20; 325/13

[56] References Cited
UNITED STATES PATENTS

| | | | |
|---|---|---|---|
| 2,853,550 | 9/1958 | Reid | 178/69.5 TV |
| 2,980,858 | 4/1961 | Grundin et al. | 178/69.5 R |
| 3,024,417 | 3/1962 | Secretan | 178/69.5 R |
| 3,336,440 | 8/1967 | Blake et al. | 331/20 |
| 3,384,821 | 5/1968 | Beck | 325/13 |
| 3,814,855 | 6/1974 | Kokado | 178/69.5 TV |

Primary Examiner—Malcolm A. Morrison
Assistant Examiner—Errol A. Krass
Attorney, Agent, or Firm—John T. O'Halloran; Menotti J. Lombardi, Jr.; Peter Van Der Sluys

[57] ABSTRACT

The invention provides a circuit for centrally generating the horizontal and vertical sweep frequencies in a TV receiver. A central oscillator provides a frequency which is divided to obtain the horizontal frequency. A periodic counter with adjustable final counting value divides the central oscillator frequency to establish a vertical sweep signal. Phase comparators and gate circuits are used to gate the oscillator signal to the periodic counter to synchronize the vertical sweep with the transmitted vertical sync signal.

4 Claims, 2 Drawing Figures

CIRCUIT ARRANGEMENT FOR SYNCHRONIZING A TELEVISION RECEIVER

BACKGROUND OF THE INVENTION

1. Field of the Invention

The present invention relates to a circuit arrangement for synchronizing a television receiver.

2. Description of the Prior Art

It is known from television transmitter circuit engineering, for example, to derive the necessary frequencies, such as horizontal frequency and vertical frequency, from a centrally generated frequency by division. Since the transmitters, as compared with the television receivers, represent highly centralized units on which stringent requirements are placed regarding their operational features, the expense necessary to derive the individual frequencies by dividing a so-called multifrequency is considered justifiable.

Television receivers, however, are mass-produced articles and should be as simple as possible. Therefore, it has so far been impossible to apply the technique commonly used with the transmitter to the receiver circuitry. Today's television receivers have separate oscillators for generating the horizontal and vertical sweep frequencies.

SUMMARY OF THE INVENTION

The invention is characterized in that the horizontal frequency can be derived by dividing the frequency of the central oscillator at the ratio of 2:1, that the correct phase position is obtained by comparing said horizontal frequency with the horizontal sync pulse derived from the received signal, that a periodic counter with adjustable final counting value is provided to whose input the pulses of the central oscillator, generated with the double line frequency, are applied via a gate circuit, that the counter, after reaching the adjusted final counting value, provides at its output an output signal frequencydivided by the final counting value, that, with the final counting value adjusted, the frequency of the output signal can be varied by inhibiting the gate circuit for certain periods of time and thus blanking input pulses, that an item of information generated by comparing the phase of the transmitter's vertical sync signal with that of the signal appearing at the output of the periodic counter can be fed as a control signal to the gate circuit, and that, in case of phase coincidence between the transmitter's vertical sync signal and the counter output signal, the final counting value is adjustable so that the frequency of the output signal is equal to that of the transmitter's vertical sync signal.

It is therefore the object of the invention to provide a circuit arrangement of the kind referred to by way of introduction which permits the use of a central oscillator in a simple manner.

Another advantage of the invention lies in the fact that the adjusting operations, which are undesirable during production, are necessary for one oscillator only.

In addition, the circuit is especially suited for construction in integrated technology because mainly digital circuit elements are used.

Another advantage is that a module presently incorporated in many television receivers (e.g. Intermetall's JC TBA 940) is suitable for the generation of the double line frequency by halving the frequency-determining capacitance.

It is worth mentioning that line interlacing is automatically achieved by this interconnection of line and frame frequency.

One embodiment of the invention is characterized in that the final counting value is adjusted so that the frequency of the counter output signal lies above that of the vertical sync signal, that in case of a phase departure of 0°–180° of the two signals to be compared, the gate circuit is open, and that in case of a phase departure of 180°–360° the gate circuit is periodically closed for at least such a time that the signal appearing at the output of the periodic counter has a lower frequency than the vertical sync signal.

The advantage of this embodiment lies in the fact that the picture locks toward the correct side within the shortest possible time, i.e, depending on whether, in case of a phase error, the bar of the vertical blanking is in the upper or lower half of the screen, the picture will lock toward the top or bottom.

Further details of the invention will be apparent from the following description and from the accompanying drawings.

DESCRIPTION OF THE PREFERRED EMBODIMENT

Figure 1:
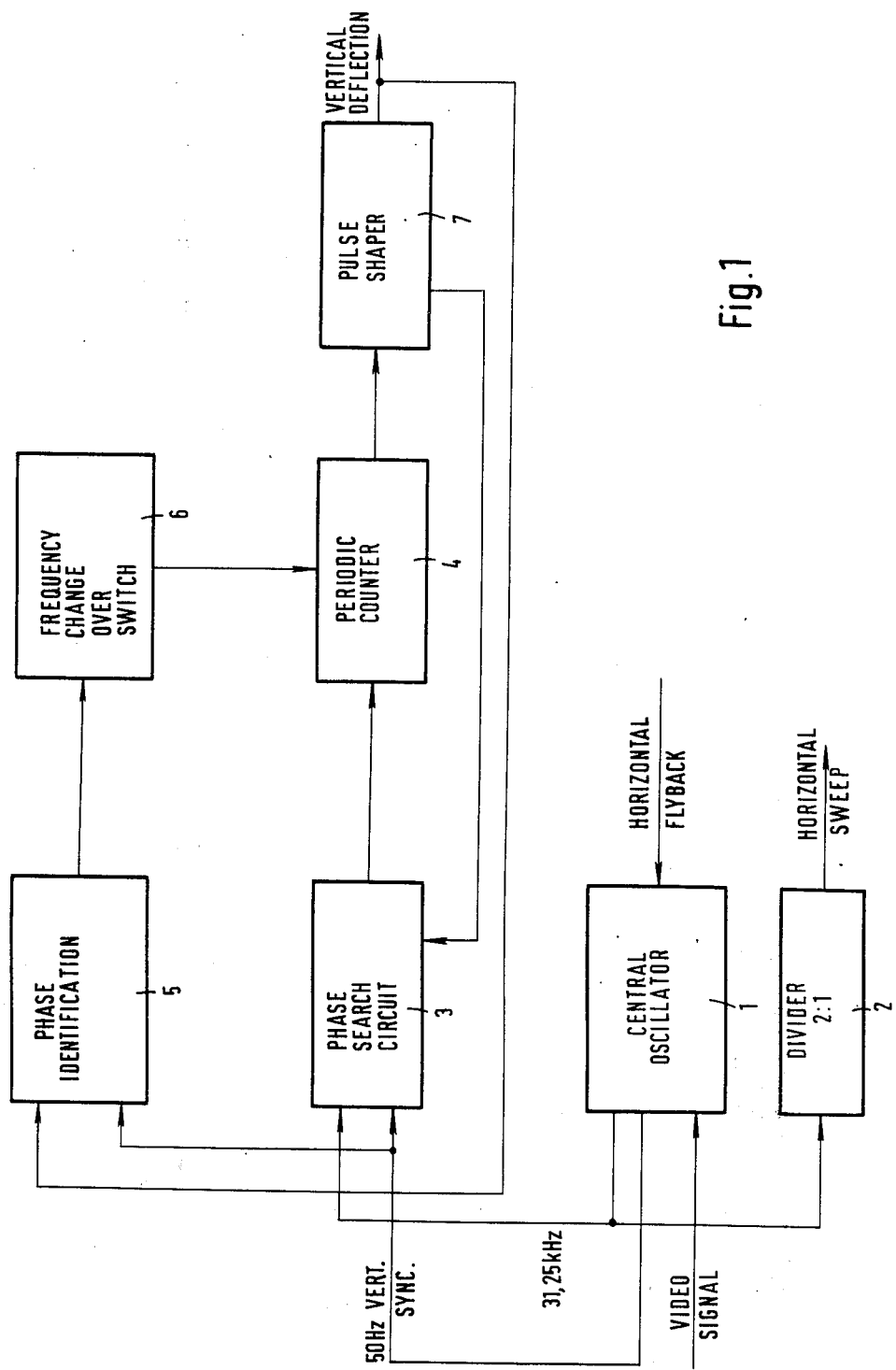
FIG. 1 is a functional block diagram showing the basic functions of the present invention.

In FIG. 1, the central oscillator for generating the double line frequency is designated 1. Fed to this central oscillator are the composite video signal coming from the transmitter and the horizontal flyback pulse for fixing the correct phase relation. This design is advantageous if, for example, the aforementioned commercially available integrated modules are used.

The output signal of block 1 with a frequency of 31.25 kHz is fed, on the one hand, to a divider circuit 2 for generating the horizontal sweep frequency, which circuit also forms the pulse shape necessary for the deflection circuit.

The output signal of the block 1 with a frequency of 31.25 kHz and the transmitter's 50-Hz vertical sync signal, selected from the composite video signal, are fed to a phase search circuit 3, to which is also fed, via the circuit 7, the signal obtained by division in the periodic counter 4. The phase search circuit derives from the comparison of the applied signals an item of information for controlling the periodic counter 4. The output signal of the frequency divider is fed to a circuit 7 where it is brought to a given pulse shape or duration. The signal, controlled in this way, is fed to the vertical deflection circuit.

A phase identification circuit distinguishes between the conditions, such as coincidence or not, between the transmitter signal and the signal generated in the receiver and, in response thereto, controls a frequency changeover switch 6 which determines the final counting value of the periodic counter 4.

Figure 2:
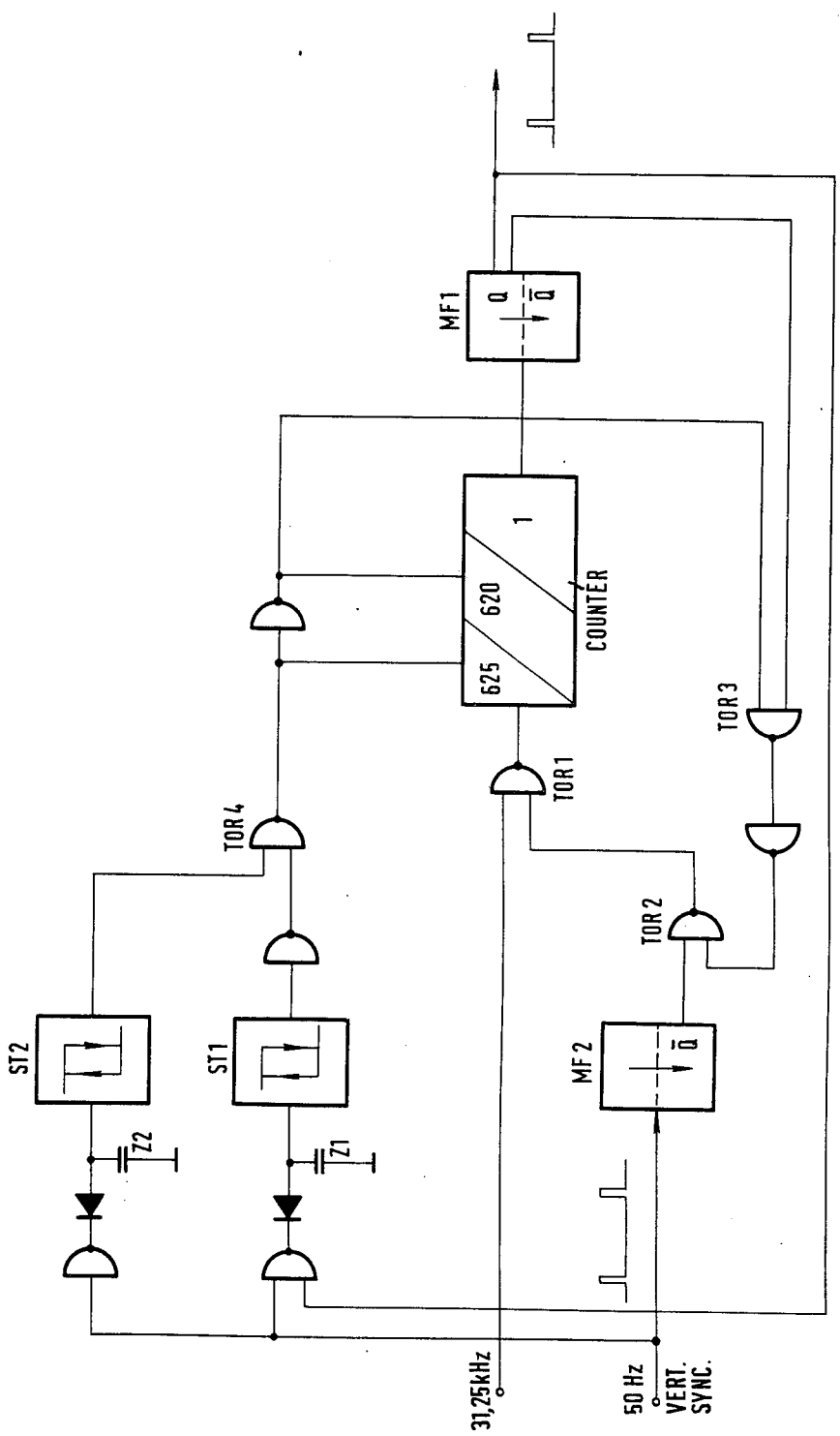
FIG. 2 is a block diagram showing the circuit portions needed to control the frequency division for obtaining the vertical frequency.

As shown in FIG. 2, the pulses of 31.25 kHz, generated in the block 1 of FIG. 1, are fed through a gate TOR 1 to the periodic counter with the division factor 620:1. This means that the following monoflop MF1 is triggered after each 620th pulse. The pulse duration is, e.g., 320 µs, according to the duration of 10 pulses of the input frequency. These pulses leave the monoflop MF1 at a frequency of 50.4 Hz, so that, referred to the 50-Hz transmitter pulse, the picture rolls down. This beat frequency of +0.4 Hz (referred to the 50-Hz transmitter frequency) is, however, permitted only if the pulse generated in the receiver and not having the correct phase relation is in the lower half of the picture. If the pulse is in the upper half of the picture, a negative beat frequency (or lower than 50 Hz) is to cause the picture to roll up. Thus, in case of incorrect phase relation, coincidence between the two pulses to be compared is to be achieved within the shortest possible time instead of having to wait until almost an entire frame roll has taken place as has so far been necessary in the worst case.

The frequency needed for the shortest search is identified and generated as follows.

The output pulse of the monoflop MF1 is compared with the output pulse of the monoflop MF2. The latter is triggered by the 50-Hz transmitter pulse derived from the composite video signal. The pulse duty factor is set at 1:1 so that after one-half field period = 10 ms the output $\bar{Q}$ of the monoflop goes high.

If the output of MF1 lies in the lower half of the picture, the output state of the gate TOR 2 (high) enables the gate TOR 1 so that all arriving pulses of the frequency 31.25 kHz can pass and the periodic counter is driven as described above. The output frequency is 50.4 Hz, and, as mentioned hereinbefore, this causes the picture to roll down so that coincidence is achieved quickly.

If the output pulse lies in the upper half of the picture, the inverted pulse of the monoflop MF1 appears at the output of gate TOR 2 so that gate TOR 1 is turned off for the duration of the pulse. As mentioned, the pulse duration is 320 $\mu$s, i.e., gate TOR 1 is turned off for 320 $\mu$s; referred to the 31.25 kHz frequency this means that exactly 10 pulses are blanked. Thus, a pulse appears at the output of the divider only after the duration of 630 pulses, which is equivalent to an output frequency of 49.6 Hz. Hence, the picture on the screen rolls up.

All that remains to be done now is to achieve coincidence, i.e., the correct phase relation.

It is assumed that the output pulse of the monoflop MF1 lies in the upper half of the picture with incorrect phase postion. Through the above-described blanking of the 10 pulses the divider provides a frequency <50 Hz so that the picture is shifted upwards in the direction of the correct phase position. Looking at the output of gate TOR2, referred to the 50-Hz transmitter pulse, an approximation of the pulse of the monoflop MF1 to the transmitter pulse up to overlapping will be perceived. With the same measure of overlapping the blanking pulse at the gate TOR 1 becomes narrower. With each additional pulse at the divider, however, the output frequency increases. The pulses overlap to such an extent that only 5 pulses (160 ms) are blanked, for example. After 625 pulses a pulse now appears at the output of the divider; this corresponds to a frequency of exactly 50 Hz. Thus, the picture is stable.

The coincidence of the two 50-Hz pulses, achieved in this way, must now be considered under two aspects. If, for example, the two leading edges do not coincide, the picture flyback will be initiated with a delay of, e.g., 2½ lines. Secondly, the 50-Hz frequency at the output of the periodic counter is unstable inasmuch as each interference pulse in the transmitter's composite video signal can immediately change the monoflop MF2 to the unstable state, which automatically results in a new search. Both disadvantages can be avoided if the divider can be permanently switched to 625:1 $\triangleq$ 50 Hz after coincidence has been achieved. Then, both leading edges coincide exactly, and due to the fact that the 50 Hz are tied to the double line frequency, all interference pulses which do not disturb the central oscillator directly have no effect.

The switching information for the periodic counter is obtained from the phase identification circuit 5 (FIG. 1), which consists of the two timing elements Z1 and Z2 and the Schmitt triggers ST1 and ST2. If there is no coincidence and the 50-Hz sync pulse from the transmitter's composite video signal is present, the output of the gate TOR 4 is low, so that in the periodic counter the division factor 620:1 is turned on and a search begins. When conicidence is achieved, the output of gate TOR 4 goes high, and the division factor 625:1 is turned on; through the negation of this switching information the division factor 620:1 is turned off and the output of the gate TOR 3 goes high whereby any interference pulses reaching the monoflop MF2 produce no effect. The function of the second timing element with the Schmitt trigger ST2 is to prevent, in cooperation with ST1, the possible absence of a few sync pulses in the transmitter signal from being not detected and the periodic counter from not being turned on.

This circuit arrangement achieves for the vertical deflection an elimination of interference which is always as good as that for the line frequency.

What is claimed is:

1. A synchronizing circuit, for providing synchronized horizontal and vertical deflection control signals in a television receiver in a TV system of the type wherein a composite video signal including horizontal and vertical sync pulses is received by the receiver, comprising the combination of:
    an oscillator providing a signal at a frequency equal to a multiple of the frequency of the horizontal deflection of the video signal, said oscillator being synchronized by the horizontal sync pulses;
    a frequency dividing means for receiving said oscillator signal, dividing its frequency by said multiple and providing said horizontal deflection control signal;
    a periodic counter connected to receive the oscillator signal and provide an output when a final count is reached, said output being a vertical deflection control signal and having a frequency equal to the frequency of the oscillator signal divided by the final count value of the counter;
    blanking gate means for comparing the vertical deflection control signal with the received vertical sync signal and providing a blanking gate control signal to said periodic counter in response thereto; and
    switch gate means to compare the vertical deflection control signal and vertical sync pulses to switch the periodic counter into one of two final counting conditions, whereby the blanking and switch gate means enable the frequency and phase of the vertical deflection control signal to be synchronized with the received vertical sync signal.

2. A synchronizing circuit as described in claim 1, wherein the final count of the periodic counter may be switched to either a first or a second predetermined final count and the circuit additionally comprises, means for detecting phase coincidence between the vertical sync signal and the vertical deflection control signal and providing an output in response thereto, said periodic counter being responsive to the output of the phase coincidence detecting means to switch to the second predetermined final count at which frequency the vertical deflection control signal equals the frequency of the vertical sync signal.

3. A synchronizing circuit as described in claim 1, wherein the oscillator provides a signal at a frequency equal to twice the frequency of the horizontal deflection of the video signal.

4. A synchronizing circuit as described in claim 3, wherein the oscillator frequency equals 31.25 kHz, the vertical sync signal has a frequency of 50 Hz, the first final count equals 620, the second final count equals 625 and the frequency dividing means divides said oscillator signal by a factor of 2.

* * * * *